United States Patent

Zeiss

[15] 3,670,000

[45] June 13, 1972

[54] PROCESS OF PRODUCING DIFFICULTY SOLUBLE METAL GLUCONATES

[72] Inventor: Otto Zeiss, Schwetzingen, Germany

[73] Assignee: Joh. A. Benckiser GmbH, Chemische Fabrik, Ludwigshafen/Rhine, Germany

[22] Filed: June 19, 1970

[21] Appl. No.: 47,724

[52] U.S. Cl. ..................260/439 R, 260/535 R, 424/295
[51] Int. Cl. ..................C07j 15/02, C07c 59/10
[58] Field of Search ..................260/439 R, 535 R; 424/295

[56] References Cited

UNITED STATES PATENTS 3,172,898   3/1965   Wymore ..................260/439
3,397,215   8/1968   Hettinger ..................260/429

Primary Examiner—Tobias E. Levow
Assistant Examiner—A. P. Demers
Attorney—Erich M. Radde, Charles A. McClure, Gerard J. Weiser and Alfred Stapler

[57] ABSTRACT

Difficulty soluble metal gluconates are obtained by passing a monovalent metal gluconate solution through a cation exchange material charged with the metal ion corresponding to the metal ion of the difficulty soluble metal gluconate.

8 Claims, 1 Drawing Figure

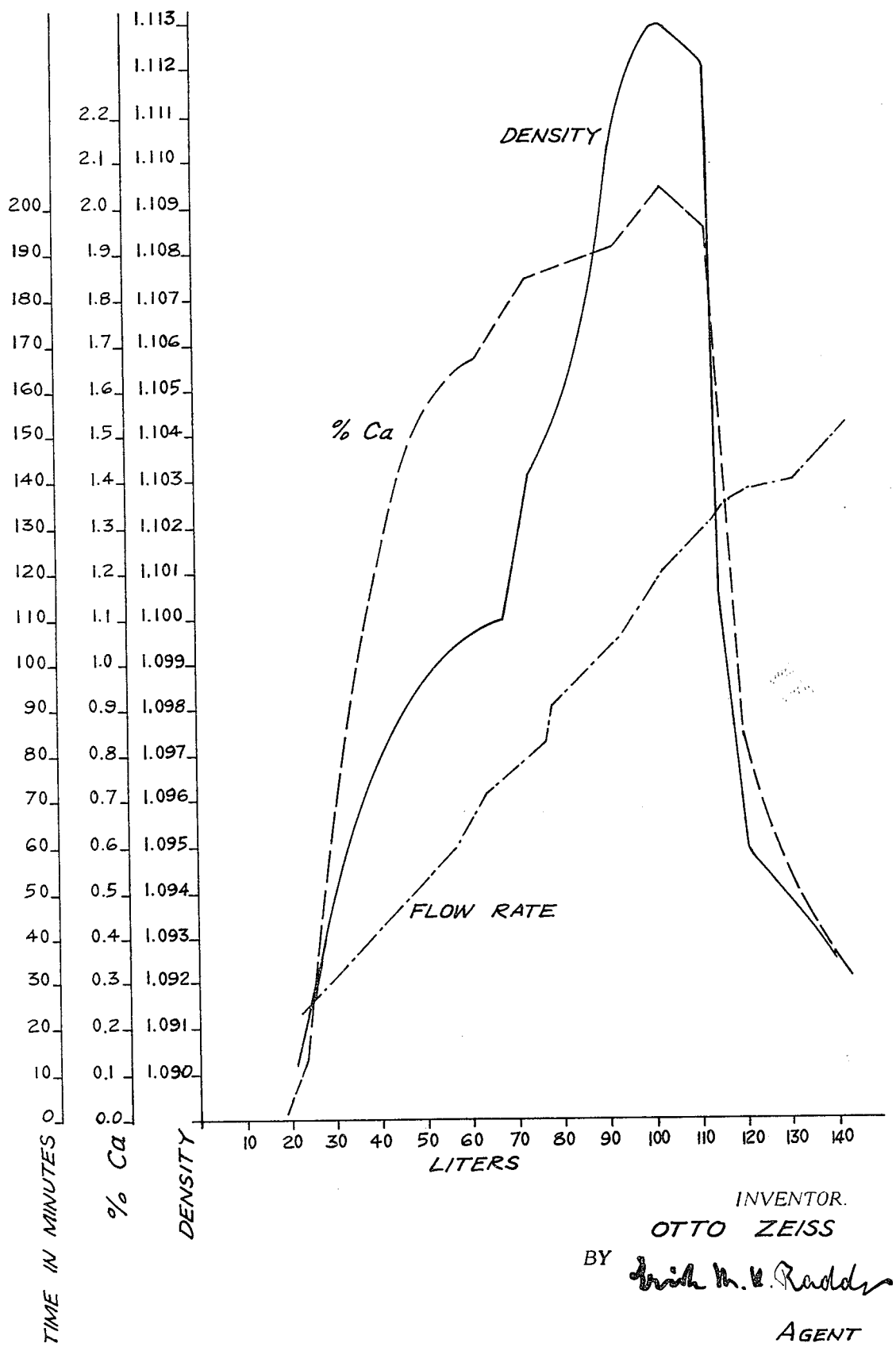

PROCESS OF PRODUCING DIFFICULTY SOLUBLE METAL GLUCONATES

BACKGROUND OF THE INVENTION

1. Field of the Invention

The present invention relates to an improved process of producing bivalent metal salts of gluconic acid which are difficultly soluble in water at room temperature and more particularly to such a process whereby aqueous solutions of monovalent metal gluconates are used as starting material.

2. Description of the Prior Art

Processes of producing difficultly soluble metal gluconates are known. For instance, calcium gluconate is precipitated from aqueous gluconic acid solutions obtained by electrolytic or microbiochemical oxidation of glucose, by neutralization with milk of lime.

Difficultly soluble metal gluconates are also obtained by reacting readily soluble neutral metal salts of gluconic acid such as sodium gluconate with other soluble metal salts which form difficultly soluble metal salts on such reaction, for instance, with calcium chloride.

When proceeding according to these known processes, the metal gluconates are precipitated from solutions which contain other accompanying substances such as nutrient salts, residual cations and anions, and others. As a result thereof the metal gluconates which precipitate in the form of a cheesy precipitate, are contaminated considerably. They enclose, or hold firmly absorbed, such foreign ions in larger or smaller amounts. Therefore, it is necessary to wash the precipitates thoroughly. However, such thorough washing results in an only partial removal of the impurities although it is accompanied by considerable losses. Furthermore, the mother liquors obtained thereby cannot be recirculated or utilized economically.

In order to produce metal gluconates of a higher degree of purity as obtained by proceeding in the aforesaid manner, readily water soluble metal gluconates such as sodium gluconate have been subjected to the action of strongly acid cation exchange materials in the hydrogen ion form. The free gluconic acid is obtained when proceeding in this manner. The desired difficultly soluble metal salts can then be precipitated from said free gluconic acid by neutralization with the corresponding metal salts. To avoid contamination with foreign ions on such precipitation, it is necessary to use metal compounds which do not contain anions or which contain anions that are set free in the gaseous state. However, such metal compounds, for instance, the carbonates, hydroxides, oxides of polyvalent metals are insoluble in water thus causing difficulties on precipitation of the difficultly soluble metal gluconates from aqueous solutions of the free gluconic acid. Furthermore, such a procedure is rather complicated because usually rather dilute solutions of the free gluconic acid are obtained which must be concentrated by evaporation before precipitation of the difficultly soluble metal gluconates. In addition thereto, the ion exchange agent must be regenerated requiring further operations and expenditures.

When producing difficultly soluble metal salts large scale, of gluconic acid on a alrge scale, it is of importance that the resulting metal gluconates do not contain foreign cations and anions. Otherwise they are strongly discolored or cake and agglomerate on drying in a fluidized bed drier or in a pneumatic conveying drier. Furthermore, the resultant metal gluconates do not fully meet the requirements established for pharmaceutically useful compounds and compositions.

SUMMARY OF THE INVENTION

It is one object of the present invention to provide a simple and effective process of producing bivalent metal gluconates which are difficultly soluble in water at room temperature and which are of a degree of purity heretofore only obtainable by complicated purification processes.

Other objects of the present invention and advantageous features thereof will become apparent as the description proceeds.

In principle the process of producing difficultly soluble bivalent metal gluconates according to the present invention consists in a. allowing an aqueous solution of a readily soluble monovalent metal gluconate to flow slowly through a cation exchange material charged with bivalent metal ions, the amount of said monovalent metal gluconate being about equivalent to the charge of the cation exchange agent with bivalent metal ions, b. thereby operating, depending upon the solubility of the resulting bivalent metal gluconate, at such a concentration of the starting gluconate solution that, after the ion exchange reaction, the bivalent metal gluconate precipitates from the resulting supersaturated solution without concentration by evaporation.

Preferred cation exchange materials are those based on polystyrene and phenol resins having active $-SO_3H$ groups. Cation exchange materials with weakly acid active groups can also be used when carrying out metathetical reaction, or double decomposition, at the weakly acid cation exchange material.

The temperature of the gluconate solution during reaction with the cation exchange material can be between about 20° C. and about 90° C. The speed with which the metal gluconate solution passes through the ion exchange material is between about 0.1 liter/hr./liter and about 20 liters/hr./liter of cation exchange material and is preferably between about 0.1 liter/hr./liter and about 3 liters/hr./liter.

The procedure according to the present invention permits to directly use as starting material the filtered, neutralized, crude gluconate solution as it is obtained by fermentation or electrolytic oxidation of glucose.

According to the present invention the difficultly soluble metal gluconate precipitates from its super-saturated solution in a loose, finely disperse form after standing for some time and can readily be filtered. It is pure white and of a high degree of purity. Therefore, it can be dried in a fluidized bed drier or a pneumatic conveying drier at a high temperature without discoloration and aggregation to lumps. The filtrate can be recirculated for preparing fresh starting solutions because it contains substantially no foreign ions and thus does not burden the ion exchange material. The metal gluconate which is dissolved in the mother liquor is not lost on proceeding in this manner. It is not necessary to recover the same by complicated and expensive concentration by evaporation of the mother liquor. Thus it is possible according to the process of the present invention to recover metal gluconates which are difficultly soluble in water at room temperature, such as calcium, magnesium, or ferrous gluconate in a yield of 70 to 80 percent of the theoretical yield.

It is entirely unexpected and could not be foreseen that the entire amount of the polyvalent metal ions present in the ion exchange material will be exchanged by an equivalent amount of the gluconate with a cation of a lower valency because in general, as is well known, the affinity of the ions to the ion exchange material increases with their valency. Thus, for instance, the exchange of bivalent cations during regeneration is possible only by using a large excess of monovalent cations. Therefore, it is customary to use for displacing bivalent cations in the neutral exchange reaction an excess of 200 to 300 percent of the regenerating agent calculated for an equivalent charge. In contrast thereto, the effect achieved on proceeding according to the present invention whereby only equivalent amounts of monovalent metal ions of the gluconate are required to displace the polyvalent metal ions of the exchange material, is evidently due to the interaction of the complex-forming or sequestering properties of gluconic acid, the low speed of filtration, and the low solubility of various metal gluconates. Heretofore, such an interaction has not been observed in ion exchange reactions.

When proceeding according to the present invention, it is possible to eliminate in a simple and economical manner all the dissolved ions which are not required for the neutral exchange reaction and which would adversely affect the purity of the metal gluconates on crystallization.

BRIEF DESCRIPTION OF THE DRAWING

The attached drawing illustrates diagrammatically the course of the exchange reaction according to the present invention. In said drawing the ordinates indicate the density of the gluconate solution, the percent calcium in the gluconate solution, and, in minutes, the rate of flow of the sodium gluconate solution through the cation exchange material, while the abscissa indicates, in liters, the amount of sodium gluconate solution flowing through the cation exchange material. The solid curve represents the specific gravity, the broken-line curve the calcium content in percent, and the dash-and-dot-line curve the rate of flow per liter of ion exchange material per minute.

DESCRIPTION OF THE PREFERRED EMBODIMENTS

The following examples serve to illustrate the present invention without, however, limiting the same thereto.

EXAMPLE 1

Production of Calcium Gluconate from Sodium Gluconate 23.1 kg of sodium gluconate are dissolved in 81.6 liter of water. The resulting about 22 percent sodium gluconate solution has a density of 1.120 at 20° C. It is passed through a fixed-bed column of 70 liter of the strongly acid, $-SO_3H$ group containing polystyrene-type cation exchange resin sold under the trademark DUOLITE C-20 by Diamond Alkali Co. of Redwood City, Calif., in its calcium ion form. The rate of flow of said gluconate solution is 1 liter/hour/liter of cation exchange agent. A first running of about 23 liter which corresponds to the pore volume of the ion exchange resin is discarded. After the entire amount of the sodium gluconate solution is passed through the ion exchange resin, the residual amount of gluconate solution which occupies the pore volume of the ion exchange resin, is displaced by water. About 105 liter of calcium gluconate solution are obtained in this manner. Crystallization of said solution sets in on standing at room temperature for 1 to 2 hours. After standing for 6 to 8 hours, the solution solidifies to a white mass of loose crystals. After suction filtration on a rotary filter, 35.5 kg. of moist calcium gluconate are obtained. The salt is dried in a fluidized bed drier at 60° to 80° C. within 25 to 40 minutes. No discoloration or lump formation of the calcium gluconate takes place on drying. The yield of dry calcium gluconate is 17.7 kg. corresponding to a yield of 76 percent of the theoretical yield.

The resulting calcium gluconate has a sodium content of less than 0.02 percent contains 0.02 percent halogen and 0.002 percent of heavy metals. 2 g. of the calcium gluconate dissolve in 100 cc. of water at room temperature within 4 to 5 hours. According to DAB 6, 3. supplement (1959), 2 g. of calcium gluconate must dissolve in 100 cc. of water within 6 hours.

The mother liquor containing about 5 kg. of calcium gluconate is recirculated and used for preparing the solution of sodium gluconate to be converted into calcium gluconate in subsequent operations. The mother liquor does not contain cations with the exception of calcium ions derived from calcium gluconate. Therefore, it does not burden the ion exchange resin. On the contrary it contributes to an increase in yield in the subsequent exchange filtration due to its higher concentration.

The calcium ion form of the ion exchange resin is obtained by treating the ion exchange resin with 150 g. of calcium chloride for each liter of exchange resin whereby the calcium chloride is applied in 20 percent aqueous solution. After converting the resin into the calcium ion form it is washed free of chloride ions.

EXAMPLE 2

Production of Magnesium Gluconate from Sodium Gluconate 1.98 kg. of sodium gluconate are dissolved in 2.97 kg. of water. The resulting 40 percent sodium gluconate solution has a density of 1.207 at 20° C. It is passed through 6 liters of the strongly acid, $-SO_3H$ group containing cation exchange resin sold under the trademark DUOLITE C-20, in its magnesium ion form at a rate of flow of 1 liter/hour/liter of cation exchange agent. The first running corresponding in its volume to the pore volume of the exchange resin is discarded. After the sodium gluconate solution has been placed upon and passed through the exchange resin, the residual gluconate solution present in the exchange resin is displaced therefrom by washing with water. 5.5 liter of filtered magnesium gluconate solution are obtained. Magnesium gluconate precipitates therefrom within 8 hours. After suction filtration on a rotary filter and drying in a fluidized bed drier, 1.4 kg. of pure white magnesium gluconate are obtained. Yield: 71 percent of the theoretical yield.

The mother liquor is used as solvent for preparing the sodium gluconate solution for subsequent filtration through the cation exchange resin.

The magnesium form of the cation exchange resin is obtained by treating the exchange resin with 200 g. of magnesium chloride $MgCl_2.6H_2O$ in 20 percent aqueous solution for each liter of exchange agent.

EXAMPLE 3

Production of Ferrous Gluconate from Sodium Gluconate

Ferrous gluconate is preferably prepared from 40 percent sodium gluconate solution. Such a solution is obtained by dissolving 3.3 kg. of sodium gluconate in 4.95 kg. of water. The resulting solution has a density of 1.230 at 20° C. It is passed through 10 liters of the strongly acid, $-SO_3H$ group containing cation exchange resin sold under the trademark DUOLITE C-20, in the ferrous ion form, at a rate of flow of 1 liter/hour/liter of exchange resin. The first running in the amount of 2 liters is discarded. After all the sodium gluconate solution has been placed on the ion exchange resin, the residual gluconate solution in said exchange resin is displaced by water. About 11 liter of combined filtered solution and wash water are obtained. The ferrous gluconate precipitates therefrom after 1 hour. It is filtered off by suction and is dried at 40° to 60° C. in a fluidized bed drier. Thereby no substantial darkening of the salt takes place. A loose, light-green powder is obtained. The yield is 79 percent of the theoretical yield.

The mother liquor is recirculated for preparing the sodium gluconate solution used in a subsequent operation.

The ferrous form of the cation exchange resin is obtained by treating the ion exchange resin with 278 g. of ferrous sulfate $FeSO_4·7 H_2O$ in 20 percent aqueous solution for each liter of exchange resin. After conversion into the ferrous form, the cation exchange resin is washed free of sulfate ions.

EXAMPLE 4

Production of Calcium Gluconate from a Neutralized and Concentrated Gluconic Acid Solution Obtained by Fermentation The starting solution is a dark brown, 35 percent aqueous sodium gluconate solution obtained by neutralizing, with sodium hydroxide, a gluconic acid solution produced by fermentation of glucose and concentration by evaporation. Said starting solution is stirred with 5 g. of activated charcoal and 30 g. of bentonite per kg. of solution at room temperature for 3 hours whereafter it is filtered. The filtrate is a clear yellowish liquid.

1,000 cc. of said solution which has a specific gravity of about 1.190 at 20° C. are filtered over 1 liter of the strongly acid, $-SO_3H$ group containing cation exchange resin sold under the trademark DUOLITE C-20, in its calcium form, at a rate of flow of 0.7 liter to 1 liter/hour/liter of exchange resin. A first running amounting to the pore volume of the exchange resin is discarded. After the entire sodium gluconate solution has been placed on the ion exchange resin, the residual gluconate solution present in the exchange resin is displaced with water by washing. 1,100 cc. of filtrate are obtained. The calcium gluconate crystallizes therefrom within 12 hours. On suction filtration and drying in a fluidized bed drier, 220 g. of pure white calcium gluconate are obtained. The yield is about 63 percent of the theoretical yield. It contains no more impurities than the calcium gluconate obtained from pure sodium gluconate according to Example 1.

In place of the strongly acid, $-SO_3H$ group containing cation exchange resin of the styrene polymer type used in the preceding examples, there can be employed other strongly acid styrene polymer type resins with active $-SO_3H$ groups, such as, for instance, the cation exchange resins known by the trademarks AMBERLITE IR 112 and 120 (Rohm & Haas Co.);
DOWEX 50 (Dow Chemical Co.);
LEWATIT S 100 (Farbenfabriken Bayer);
IONAC C 240 (Ionac Chemical Corp.);
PERMUTIT Q and RS (The Permutit Co.);
NALCITE HCR, HGR, and HDR (National Aluminate Corp.);
WOFATIT KPS 200 (VEB Farbenfabrik Wolfen);
and others.

Strongly acid, $-SO_3H$ group containing phenol resins that have proved to be useful in the process according to the present invention are, for instance, the cation exchange resins with active $-COOH$ groups Known by the trademarks:

DUOLITE C 3 (Diamond Alkali C0.);
LEWATITE PN and KSN (Farbenfabriken Bayer);
WOFATIT F, P, and D (VEB Farbenfabrik Wolfen);
ZEOKARB 215 and 315 (Permutit Co., England);
and others.

In place of the bivalent metal salts and compounds used for converting the cation exchange resins into the corresponding bivalent metal ion form such as calcium chloride, magnesium chloride, and ferrous sulfate as used in the preceding examples, there can be used other water soluble calcium, magnesium, and iron salts as well as the water soluble salts of other bivalent metals. Treatment of the thus converted cation exchange resins with an alkali metal gluconate solution as described in the preceding examples yields the corresponding bivalent metal gluconates.

The drawing shows that, for instance, when producing calcium gluconate according to the present invention, there is practically no calcium gluconate containing first run and after run. Almost the entire cation exchange and formation of calcium gluconate take place within a well defined range as is evident from the steep ascent and descent of the curves indicating the calcium content and thus the calcium gluconate content of the eluate and its density. The maximum increase in density corresponds quite well with the maximum calcium gluconate content of the eluate. The density is, of course, dependent on the mode of operation, i.e., whether a more concentrated or a more diluted sodium gluconate is used.

I claim:

1. In a process of producing a bivalent metal salt of gluconic acid which is difficultly soluble in water at room temperature from a solution of a monovalent metal gluconate by means of a cation exchange material, the improvement which comprises
   a. allowing an aqueous solution of a monovalent metal gluconate to pass through a cation exchange material charged with bivalent metal ions,
   b. thereby operating, in accordance with the low solubility of the resulting bivalent metal gluconate, with a monovalent metal gluconate solution of such a concentration that, after the ion exchange, a supersaturated solution of the bivalent metal gluconate is obtained,
   c. allowing the resulting filtered supersaturated bivalent metal gluconate solution to stand so as to precipitate said bivalent metal gluconate therefrom without evaporation and
   d. separating the precipitated bivalent metal gluconate from the mother liquor.

2. The process according to claim 1, wherein the temperature of the monovalent metal gluconate solution is between about 20° C. and about 90° C.

3. The process according to claim 1, wherein the monovalent metal gluconate solution is a sodium gluconate solution.

4. The process according to claim 1, wherein the cation exchange material is an ion exchange material charged with calcium ions and wherein the resulting difficultly soluble bivalent metal gluconate is calcium gluconate.

5. The process according to claim 1, wherein the cation exchange material is an ion exchange material charged with magnesium ions and wherein the resulting difficultly soluble bivalent metal gluconate is magnesium gluconate.

6. The process according to claim 1, wherein the cation exchange material is an ion exchange material charged with ferrous ions and wherein the resulting difficultly soluble bivalent metal gluconate is ferrous gluconate.

7. The process according to claim 1, wherein the cation exchange material is a cation exchange resin with active $-SO_3H$ groups.

8. The process according to claim 1, wherein the mother liquor obtained on separating the precipitated bivalent metal gluconate from the cation exchange-treated solution is recirculated and used for dissolving the monovalent metal gluconate.

* * * * *

PO-1050
(5/69)

UNITED STATES PATENT OFFICE
CERTIFICATE OF CORRECTION

Patent No. 3,670,000    Dated  June 13, 1972

Inventor(s)  OTTO ZEISS

It is certified that error appears in the above-identified patent and that said Letters Patent are hereby corrected as shown below:

Column 1, line 58: Cancel "large scale," column 1, line 59: "alrge" should read -- large --; column 3, lines 23, 26, 31, 37, and column 4, line 10: "liter" should read -- liters --; column 3, line 23: "kg" should read -- kg. --; column 3, line 49: Before "contains" insert -- and --.

Signed and sealed this 10th day of October 1972.

(SEAL)
Attest:

EDWARD M. FLETCHER, JR.
Attesting Officer

ROBERT GOTTSCHALK
Commissioner of Patents